Sept. 18, 1962 B. F. BREGI 3,054,226
APPARATUS FOR HONING GEARS
Filed Oct. 23, 1959 2 Sheets-Sheet 1

INVENTOR.
BENJAMIN F. BREGI
BY Whittemore
Hulbert & Belknap
ATTORNEYS

Sept. 18, 1962 B. F. BREGI 3,054,226
APPARATUS FOR HONING GEARS
Filed Oct. 23, 1959 2 Sheets-Sheet 2

INVENTOR.
BENJAMIN F. BREGI
BY Whittemore,
Hulbert & Belknap
ATTORNEYS

United States Patent Office 3,054,226
Patented Sept. 18, 1962

3,054,226
APPARATUS FOR HONING GEARS
Benjamin F. Bregi, Grosse Pointe, Mich., assignor to National Broach & Machine Company, Detroit, Mich., a corporation of Michigan
Filed Oct. 23, 1959, Ser. No. 848,323
2 Claims. (Cl. 51—52)

The present invention relates to method and apparatus for honing gears.

Present day gear honing is an operation in which a work gear, which may be a hardened steel gear, is rotated in mesh, usually at crossed axes, with a gear-like honing tool under conditions which establish pressure between the engaged surfaces of the teeth of the gear and the teeth of the hone.

In order to distribute the honing action of the teeth of the hone from end to end of the teeth of the gear it is usual to provide axial reciprocation of the gear at a slow rate during relative rapid rotation thereof. The axial traverse of the work gear may be on the order of a few inches a minute while its rotative speed may be such as to produce a pitch line velocity of several hundred feet a minute.

The honing tool is in the form of a gear conjugate to the work gear having a helix angle different from that of the work gear so that the hone and work gear are brought into mesh with their axes crossed in space at a limited angle, as for example between three and thirty degrees. At least the toothed portions of the hone are formed of a relatively hard, slightly yieldable, highly resilient resin compound which is substantially solid and which has a multiplicity of separate abrasive fibers embedded therein. Such a compound may comprise epoxy resin as its resin constituent.

While a honing tool formed of epoxy resin having suitable filler such as glass fibers, finely divided abrasive material, and the like, and having the relatively large abrasive particles embedded therein, exhibits astonishing resistance to wear, nevertheless in the process of finishing thousands of work gears the material of the teeth of the hone is worn away.

As is well understood in the art, contact between unmodified teeth of helical and/or spur gear members, meshed at crossed axes, is theoretical point contact. The theoretical point of contact during rotation of the gear and hone moves generally between the crest and root of the teeth along an inclined path. The abrading action of the hone is distributed longitudinally of the teeth of the gear by the axial reciprocation of the gear as described above. However, unless additional movements are provided, the wear on the hone eventually produces longitudinally concave teeth which have extended area contact with the teeth of the work gear. In some cases this is not an undesirable situation but in other situations it is preferred to keep the area or zone of contact between the teeth of the gear and hone of limited extent. In accordance with the present invention this is accomplished by providing a very slow continuous axial reciprocation of the hone during the honing operation so that the zone or limited area of contact on the hone teeth is caused to shift from end to end thereof. Alternatively, an equivalent result may be accomplished by providing a direction of relative traverse between the gear and hone which occupies a plane parallel to the axes of both the gear and hone but which is inclined to both axes at an oblique angle.

With the foregoing general remarks in mind it is an object of the present invention to provide a method and apparatus for gear honing adapted to provide for distribution of wear longitudinally from end to end of the teeth of the hone so as to avoid development of a hollow tooth form on the hone.

More specifically, it is an object of the present invention to provide a method and apparatus for honing gears which produces a continuous gradual migration of the zone of contact between the teeth of the gear and hone longitudinally from end to end of the hone teeth.

Still more specifically, it is an object of the present invention to provide a method and apparatus for gear honing in which a slow continuous movement is imparted to the hone in the direction of the hone axis during the honing operation.

Finally, it is a further object of the present invention to provide a method and apparatus for gear honing in which, during rotation of the gear and hone in mesh, a relative traverse between the gear and hone is provided in a straight line which occupies a plane parallel to the axes of both the gear and hone, which straight line is inclined at an oblique angle to both of said axes.

Other objects and features of the invention will become apparent as the description proceeds, especially when taken in conjunction with the accompanying drawings, illustrating preferred embodiments of the invention, wherein.

Figure 1:
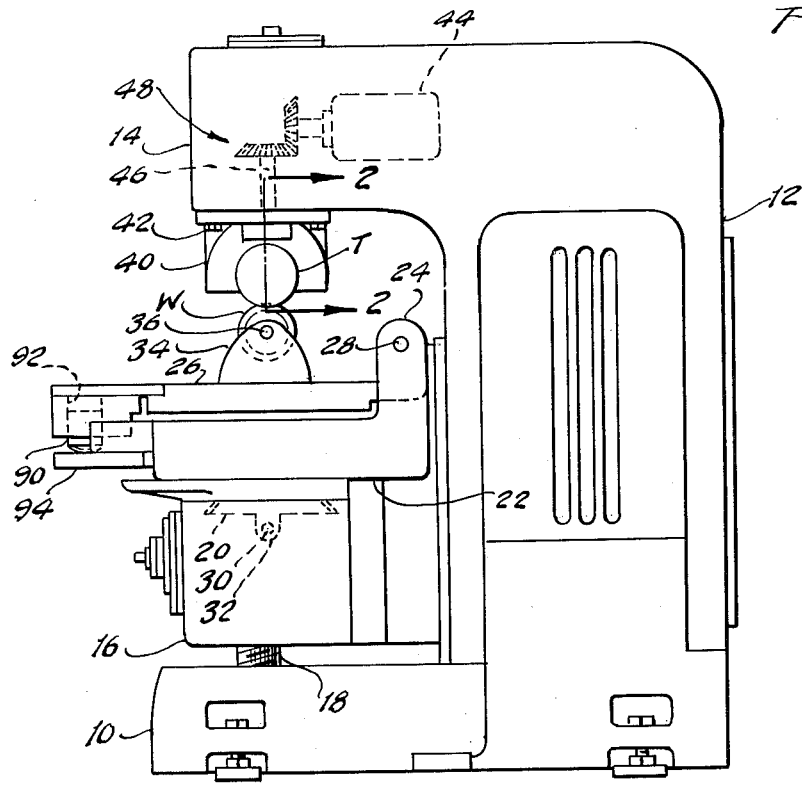
FIGURE 1 is a side elevation of a gear honing machine.

Referring first to FIGURE 1 the gear honing machine comprises a frame or base including a foot portion 10, a column 12, and an overhanging arm 14. Mounted for vertical adjustment on the front surface of the column 12 is a knee 16, this adjustment being effected by a feed screw and nut combination, a portion of the screw being shown at 18. Mounted on the upper surface of the knee for horizontal reciprocation in ways indicated diagrammatically at 20 is a slide 22 having upstanding posts 24 to which is pivoted a table 26, the pivot connection being shown at 28.

Power means are provided for reciprocating the slide 22, this means including a feed screw 30 and nut 32.

Mounted on the table 26 are a pair of work supporting heads one of which is illustrated at 34, and which includes a rotary spindle 36 for supporting a work gear W. It will be observed in this figure that the axis of the spindle 36 is horizontal and extends in parallelism with the ways 20.

Carried at the underside of the arm 14 is a tool or hone head 40 which is mounted for angular adjustment about a vertical axis by suitable means (not shown) and is adapted to be locked in adjusted position by suitable means such as screws 42 received in T-slots provided in the underside of the arm 14. Located within the arm 14 is a motor 44 adapted to drive a vertical shaft 46 through bevel gearing indicated at 48.

Figure 2:
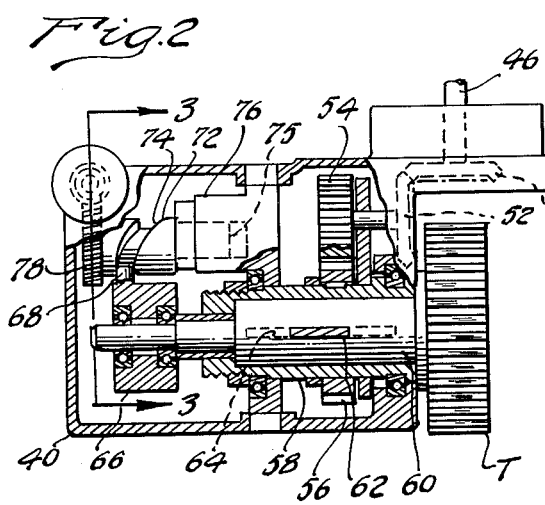
FIGURE 2 is an enlarged sectional view on the line 2—2, FIGURE 1.

Referring now to FIGURE 2 the vertical shaft 46 is indicated and the tool head 40 is shown in section. At its lower end the shaft 46 carries a bevel gear 50 which meshes with a bevel gear 52 connected to a gear 54. The gear 54 in turn meshes with a gear 56 keyed or otherwise secured to a tubular shaft 58 journaled for rotation within the tool head 40.

Longitudinally slidable within the tubular shaft 58 is a tool spindle 60 carrying the gear honing tool T. The spindle 60 is provided with drive means herein diagrammatically illustrated as a key 62 and a slot 64 so that rotation imparted to the tubular shaft 58 is transmitted to the spindle 60 and the tool T.

At its left hand end, as seen in FIGURE 2, the spindle 60 is reduced and is rotatably received in a bearing block 66 having a drive pin 68 extending upwardly therefrom.

Figure 3:
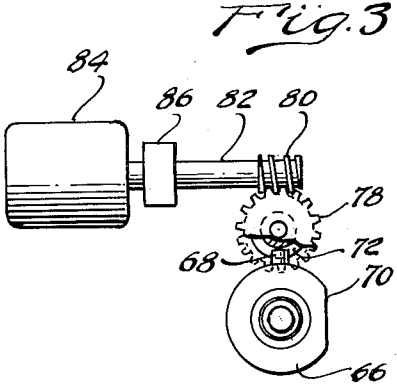
FIGURE 3 is an enlarged fragmentary view on the line 3—3, FIGURE 2.

As best seen in FIGURE 3, the bearing block 66 has a flat side as indicated at 70 engageable by a corresponding flat side at the inside of the tool head 40 so as to prevent rotation of the bearing block 66.

Associated with the bearing block 66 is a cam 72 having a cam slot 74 therein. The cam slot extends completely around the cam 72 at an angle and is continuous so that a complete rotation of the cam 72 will result first in a movement of the bearing block 66 to the right followed by a return movement of the bearing block to the left. As illustrated in FIGURE 2, the cam 72 has a laterally projecting shaft portion 75 received within a bushing 76 provided in the hone head which mounts the cam for rotation.

Carried by the cam at one end thereof is a worm gear 78 in mesh with a worm 80 carried by a shaft 82 which in turn is driven from a motor 84 through a speed reducer diagrammatically illustrated at 86. Due to the reduction of the worm-worm gear combination and to a high reduction possible in the speed reducer 86, the motor 84 when energized may produce extremely slow axial movement of the gear honing tool T, as for example a traverse sufficient to shift the hone a distance equal to its width in an interval of one or a few minutes.

The gear honing machine to which the present invention is applied is illustrated as including mechanism for controlling the operating pressure between the teeth of the tool and gear. This means comprises a piston 90 carried by the table 26 and movable downwardly in a cylinder 92 and engageable with a platform 94. Pressure admitted to the cylinder moves the piston downwardly and the reaction in the cylinder moves the pivoted table 26 upwardly about the axis of its pivot support 28. The motor connected to the feed screw 30 is now energized in forward and reverse directions to cause at least one complete reciprocation of the slide 22 in the ways 20. At the same time the motor 44 is energized to effect relatively rapid rotation of the honing tool T. In some cases a plurality of reciprocations may be provided and if necessary additional upward feeding movement of the table 26 may be provided between reciprocations if mechanism is employed locking the table 26 against vertical movement during reciprocation. Alternatively, pressure may be maintained on the piston 90 so that as material is removed from the gear the table 26 is allowed to move upwardly to maintain constant pressure.

In accordance with the present invention, in order to prevent localized wear on the hone the hone is advanced continuously by the worm and worm gear 80, 78, the speed reducer 86, and the motor 84. Conveniently, the motor 84 may be connected to be driven whenever the motor 44 is in operation. It will be understood that the work gear W is mounted for substantially free rotation between the heads 34 so that the axial traverse of the tool T has no effect on tooth form and results only in distributing the wear uniformly from end to end of the teeth of the hone.

The amplitude of reciprocation of the tool T is of course determined by the shape of the cam slot 74 and this normally will be selected such that relative traverse takes place in an amount substantially equal to the width of the hone. With this arrangement all portions of the hone teeth are subjected to a uniform or substantially uniform wearing action, and while the teeth of the hone wear away with long continued use, such wear is uniform and leaves the teeth at all times of proper involute from top to bottom and of unmodified form longitudinally. Specifically, the present invention avoids the creation of a hollow or longitudinally concave tooth surface on the hone.

It will be appreciated that by the present invention, the instantaneous area of contact between the hone and work gear is minimized. It will further be obvious that the effective pressure which determines the nature of the honing action will be determined in accordance with the upwardly acting force of the fluid within the cylinder 92 and the effective area of contact between the teeth of the gear and hone. This permits a relatively light force to be exerted between the gear and hone with corresponding improvement in accuracy in the finished product.

An additional advantage flowing from the fact that the areas of contact between the teeth are relatively small is that when a nick or burr is encountered on the teeth of the gear its removal is facilitated by the concentrated action of the small zones of the honing teeth which successively come into contact therewith.

An additional advantage of the present invention peculiar to its operation in conjunction with hones is that there is a continuous gradual controlled breakdown of the hone which tends to maintain the working zone in an efficient cutting condition, which overcomes any tendency of the honing tool to glaze.

Figure 4:
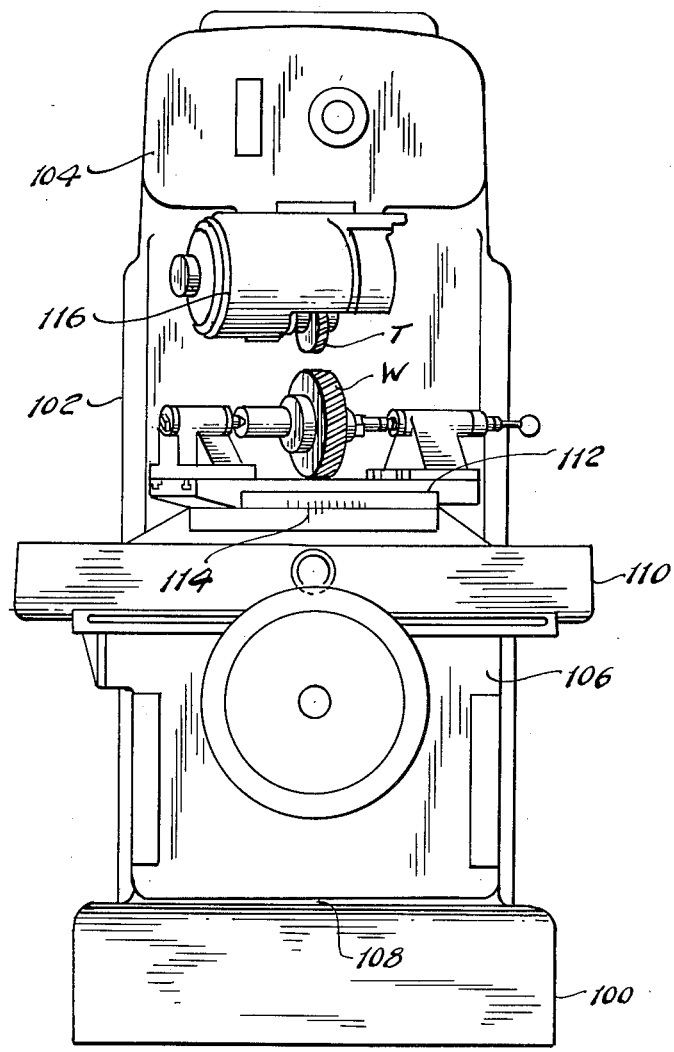
FIGURE 4 is an elevational view of a modified gear honing machine.

Referring now to FIGURE 4 there is illustrated a second embodiment of the present invention in which the gear honing machine comprises a frame including a base 100, a column 102, and an overhanging arm 104. Mounted for vertical movement on the column 102 is a knee 106 which is vertically adjustable by suitable means such for example as a feed screw and nut combination, a portion of the screw being indicated at 108. In this case there is provided a table 110 at the upper surface of the knee 106 which is mounted for horizontal reciprocation in a direction from left to right as seen in FIGURE 4. This may be accomplished by the provision of ways similar to the ways 20 shown in FIGURE 1, and by a feed screw and nut combination such as shown at 30, 32 in FIGURE 1.

In the present case however, the work gear W is mounted on an angularly adjustable plate 112 which is adjustable about a vertical axis into a predetermined position which may be observed by graduations indicated generally at 114. Thus, the work gear W may be adjusted so that the axis of the work gear extends at a desired angle with respect to the direction of reciprocation of the table 110.

As before, an angularly adjustable tool head 116 is provided at the underside of the arm 104 and is angularly adjustable, as previously described, about a vertical axis so as to bring the honing tool T into proper relationship to mesh with the work gear W with the teeth thereof crossed in space. Means similar to those shown in FIGURE 1 are of course provided for effecting positive rotation of the honing tool T which will drive the work gear W through their meshed relation.

While the machine illustrated in FIGURE 4 does not include means for providing controlled radial pressure between the tool and work, as is shown at 90, 92, 94 in FIGURE 1, such means may of course be provided if desired.

With the machine illustrated in FIGURE 4, it is possible to adjust the work gear W to a particular angularity with respect to the direction of traverse of the table 110 so that reciprocation of the table back and forth in a straight line will cause the zone of contact between the teeth of the gear and hone to shift continuously back and forth between the ends of the teeth of both the gear and hone. Thus, the honing action is distributed from end to end of the gear teeth so as to produce uniform gear teeth while at the same time the wear on the hone teeth is distributed uniformly from end to end so as to maintain accurate involutes and to eliminate the development of longitudinal hollows or concavities in the teeth of the hone. Thus, although the hone may undergo very substantial wear throughout its lifetime, its operating tooth surfaces remain substantially unmodified throughout the life of the hone. This is true although a particular hone tooth may undergo considerable wear. Nevertheless, during the useful life of the hone the surfaces at opposite sides of each tooth remain involute surfaces and the tooth surfaces do not develop the undesirable longitudinal hollows or concavities previously referred to.

The drawings and the foregoing specification constitute a description of the improved method and apparatus for honing gears in such full, clear, concise and exact terms as to enable any person skilled in the art to practice the invention, the scope of which is indicated by the appended claims.

What I claim as my invention is:

1. A gear finishing machine for use with a gear-like tool, said machine comprising a frame, a rotary work support and a rotary tool support mounted on said frame in position to support a work gear and gear-like tool in mesh with each other at crossed axes, means mounting at least one of said supports for angular adjustment about an axis perpendicular to and intersecting the axes of both of said supports, means for adjusting said supports toward and away from each other, means for driving one of said supports in rotation, the other of said supports being at least relatively freely rotatable to be driven in rotation by the meshed engagement between the gear and hone carried by said supports, means mounting said work support to said frame for back and forth traverse thereon in a direction parallel to the axis of rotation of said work support, and means mounting said tool support to said frame for back and forth traverse thereon in a direction parallel to the axis of rotation of said work support, a separate motor and cam means connecting the motor to said tool support for effecting slow continuous simultaneous traverse of both of said supports, the amount of traverse being sufficient to shift the zone of contact between the teeth of the gear and tool from end to end of the teeth of both said gear and hone.

2. A machine as defined in claim 1 in which said cam means includes a rotor having a continuous cam slot therein to provide for reciprocation of said tool support by continuous rotation of said cam.

References Cited in the file of this patent
UNITED STATES PATENTS

| | | |
|---|---|---|
| 1,115,640 | Winter | Nov. 3, 1914 |
| 1,849,868 | Einstein | Mar. 15, 1932 |
| 1,989,651 | Drummond | Jan. 29, 1935 |
| 2,542,569 | Praeg | Feb. 20, 1951 |
| 2,612,080 | Davis | Sept. 30, 1952 |